Jan. 6, 1931.  R. H. FRISBIE  1,788,097
MANURE LOADER
Filed June 26, 1929   2 Sheets-Sheet 1

Inventor
Raymond H. Frisbie
By Young Young
Attorneys

Jan. 6, 1931.  R. H. FRISBIE  1,788,097
MANURE LOADER
Filed June 26, 1929   2 Sheets-Sheet 2
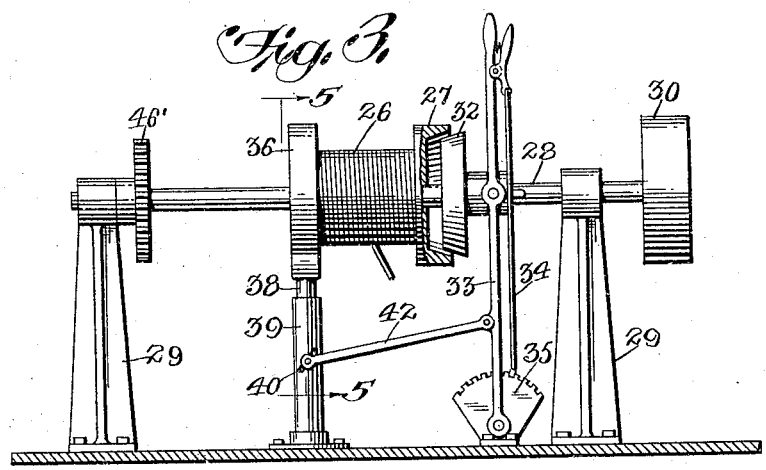
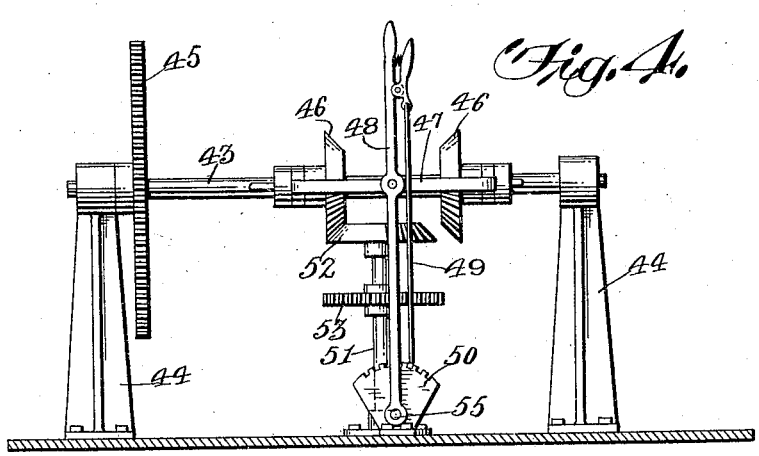
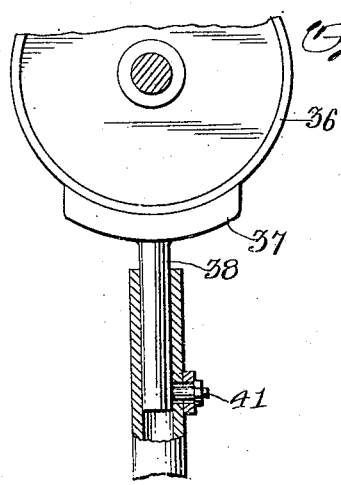
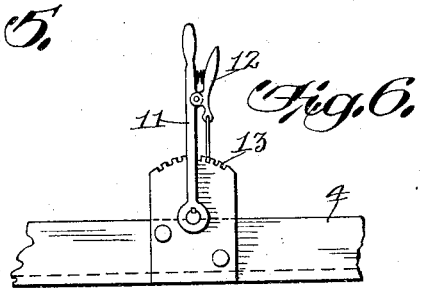
Inventor
Raymond H. Frisbie
By
Attorneys Patented Jan. 6, 1931

1,788,097

UNITED STATES PATENT OFFICE

RAYMOND H. FRISBIE, OF KEWAUNEE, WISCONSIN

MANURE LOADER

Application filed June 26, 1929. Serial No. 373,895.

This invention relates to new and useful improvements in manure loaders.

One of the objects of my invention is the provision of a device of the above character which is especially designed for application to a tractor or similar motive vehicle wherein the device may be readily moved from place to place and wherein the operative parts thereof may be connected to the motive power which operates the tractor for imparting movement to the operative parts of the device.

Another object of the present invention is the provision of a manure loader adapted to be attached to a tractor and includes a material supporting fork which is operated by suitable mechanism which receives its power from the tractor, and the fork is so mounted that it may be moved to various positions relative the tractor so as to pick up a load and transfer the load to a vehicle or any distant point.

A still further object of the invention is the provision of a manure loader which can be quickly and easily attached to the front axle of a motor vehicle and it in turn is supported by friction wheels and mounted upon the platform is suitable operating mechanism for picking up and conveying quantities of manure, the mechanism including a loading fork which may be quickly and readily moved to various positions and tilted so as to deposit the load thereon in a conveying vehicle.

With the above and other objects in view, the invention consists in the novel features of construction, the combination and arrangement of parts hereinafter more fully set forth, pointed out in the claims and shown in the accompanying drawings wherein:

Figure 3 is a transverse section on the line 3—3 of Figure 2;

Figure 4 is a transverse section on the line 4—4 of Figure 2;

Figure 5 is a vertical section on the line 5—5 of Figure 3; and

Figure 6 is a detail section on the line 6—6 of Figure 2, illustrating in elevation operating means for raising and lowering the platform.

Figure 1:
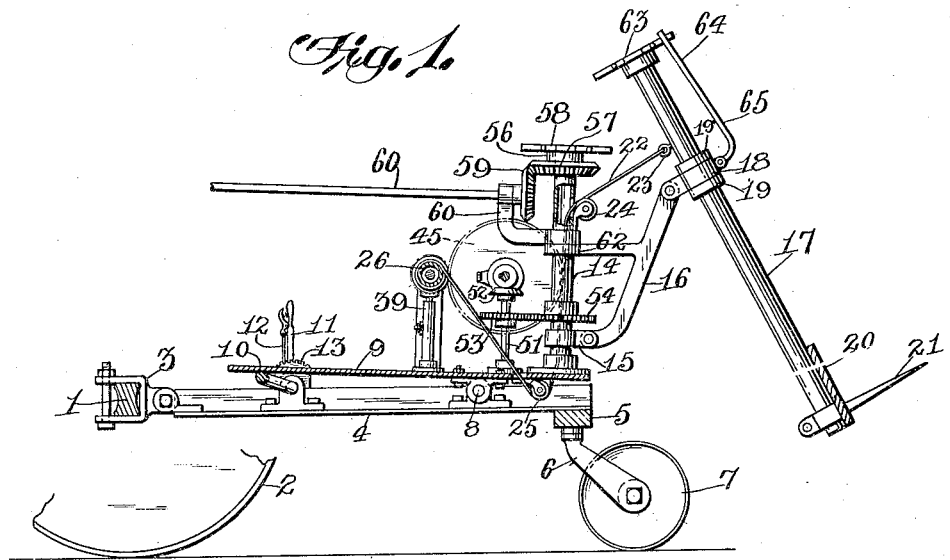
Figure 1 is a side elevation of a device constructed in accordance with my invention with parts thereof broken away and illustrated in cross section.
Figure 2:
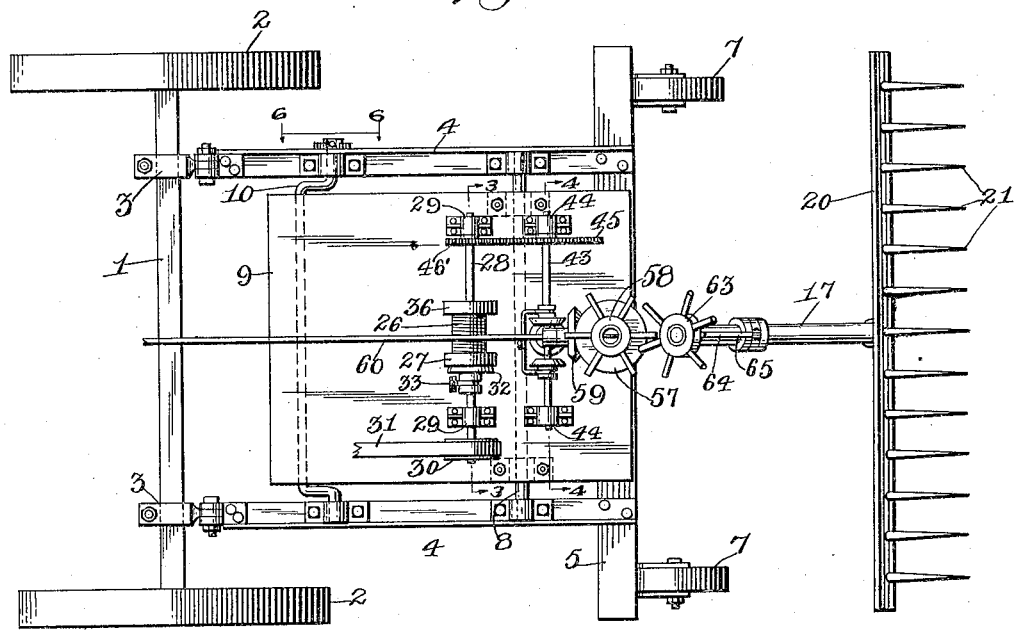
Figure 2 is a top plan view.

Referring now more particularly to the drawings, 1 indicates the front axle of a tractor having the friction wheels 2 mounted upon the ends thereof. Attached to the axle 1 and arranged in spaced relation are the brackets 3 and connected to the brackets at their inner ends are the spaced angle bars 4, the outer ends of said bars resting upon and connected to the bar 5 which lies parallel with the axle 1 and supported upon the upper end of the wheel brackets 6 carried by the front traction wheels 7.

The wheels 7 are mounted so that they can be readily moved for steering the device and causing the device to be moved in the same general direction as the tractor.

Extending transversely between the angle bars 4 and rotatably mounted in suitable bearings thereon is a shaft 8 and mounted for tilting movement upon this shaft is a platform 9. It will be noted that the shaft 8 is arranged toward the forward end of the angle bars 4 so that when the platform 9 is mounted upon the shaft, the longer end of the platform will be disposed rearwardly, and this rear end of the platform is supported by a crank shaft 10. The ends of the crank shaft 10 are mounted within suitable bearings carried by the angle bars 4 and one end of the shaft extends through the upright portion of one of the angle bars and is keyed to an operating lever 11. The operating lever carries a latch 12 adapted to engage with a segment rack 13 whereby shaft 10 may be rotated for raising and lowering the inner end of the platform and retained in various adjusted positions.

Mounted upon the front end of the platform 9 is an upright hollow standard 14, and mounted upon the standard adjacent its lower end is a bracket 15 which supports the bearing arm 16 for the fork member. This fork member includes a movable arm 17 carrying a collar 18 supported between flanges 19 and 19'.

The collar 18 is pivotally connected with the upper end of arm 16 whereby the arm 17 is not only rotatably mounted but tiltable relative to the standard 14.

Attached to the lower end of the arm is a transverse platform member 20, the outer edge of which has secured thereto a plurality of tines 21 which form a suitable fork for engaging and lifting a predetermined quantity of manure or other material.

The fork is raised and lowered through the medium of a cable 22 attached to an eyelet 23 carried by the arm 17 and arranged at a point above the collar 18, the cable being extended over a sheave 24 and thence into the hollow standard 14 down through the bottom of the platform where it can pass over a sheave 25. The cable after passing over sheave 25 extends upwardly and is wound upon a drum 26. The drum 26 carries a friction cup 27, loosely mounted upon transverse shaft 28 supported by bearings 29 on the platform 9.

Attached to the outer end of the shaft 28 is a pulley 30 which is connected by means of a belt 31 to any driven portion of the tractor to which the device is attached. Slidably mounted upon the shaft 28 and rotating therewith is a clutch cone 32 which is adapted for engagement with the friction cup 27 for rotating the drum.

Mounted upon the platform adjacent the shaft 28 is an operating lever 33, carrying a latch finger 34 adapted to engage with a segment 35 for retaining the lever 33 in various positions.

When the drum is operated for tilting the movable arm 17, it is essential that the drum be stopped directly after the clutch cone 32 is disengaged from the friction cup 27 and in order to carry this out, I provide a brake drum 36 which is attached to one end of the drum 26, and this brake drum is engaged by a brake shoe 37, the stem 38 of which is slidably mounted within the tubular guide 39. The guide 39 has a diagonal slot 40 therein and extending out through the slot from the stem 38, is a pin 41 connected to a link 42 which in turn is pivotally connected to the lever 33 so that as soon as the lever 33 is moved to an inoperative position, as shown in Figure 3, the clutch cone 32 is disengaged from the friction cup 27 and the brake shoe 37 is moved upwardly to engage the outer surface of the brake drum 36, thus stopping the rotating movement of the drum.

Arranged parallel with the shaft 28 is a shaft 43 mounted in upright standards 44 on platform 9 and this shaft carries a gear 45 which meshes with pinion 46' on shaft 28, thus movement is imparted to shaft 43 simultaneously with the rotation of shaft 28.

Keyed to the shaft 43 and rotatable therewith are the opposed friction wheels 46 retained in spaced relation by means of the bracket 47 and pivotally mounted upon the bracket 47 is a lever 48 carrying a latch bar 49 cooperating with segment 50 for retaining the wheels 46 in various adjusted positions.

Extending upwardly from the platform 9 is a rotatable shaft 51 having mounted upon its upper end a friction wheel 52. This wheel 52 is provided with a bevelled friction face adapted to cooperate with similar faces on wheels 46 so that when wheel 52 is engaged with either one of the wheels 46, rotative movement will be imparted to the upright shaft 51.

The upright shaft 51 carries a gear 53, meshing with gear 54 on the tubular standard 14 and from this structure, it will be apparent that when the lever 48 is moved upon its pivot point 55, either one of the wheels 46 may be engaged with friction wheel 52 for rotating the tubular standard 14, thus imparting a swinging movement to the fork.

Loosely mounted upon the upper end of the tubular standard 14, is a collar 56 carrying a bevel gear 57 and a sprocket wheel 58. The bevel gear 57 meshes with a similar gear 59 on the inner end of a shaft 60, shaft 60 being supported by bracket 61 which is supported upon the tubular member 14 through the medium of an annular shoulder 62.

Attached to the upper end of the movable arm 17 is a sprocket wheel 63, the prongs or sprockets of which cooperate with the prongs or sprockets of wheel 58, but normally the sprocket 63 is engaged by the bifurcated end 64 of a movable arm 65 pivotally mounted upon collar 18.

From the above description, taken in connection with the accompanying drawings, it will be apparent that in using my improved manure loader, the device can be moved in close proximity to a stack of manure and the fork readily adjusted so that the tines 21 thereof will engage with the material. The weight of the fork will cause the arm 17 to move to a substantially perpendicular position and then by operating lever 33, to move friction cone 32 longitudinally upon shaft 28, to which it is keyed, the cone will engage friction cup 27 and rotate drum 26, raising the fork so as to lift up a certain amount of material and deposit it upon the fork. In transporting the material from place to place by means of the tractor, it will not be necessary to raise the fork beyond a point which will provide clearance for the fork, but should it be desired to operate the fork for loading the material in a wagon or other conveyance, the drum is operated to move the fork toward a horizontal position until sprockets of wheel 63 will engage with the sprockets of wheel 58, and standard 14 can be then rotated to swing the fork laterally with respect to the platform through the medium of the friction wheels 52 and 46.

When it is desired to tilt the fork to discharge the load thereon, the shaft 60 can be rotated in any suitable manner from the driver's seat after arm 65 has been disengaged from the sprockets of wheel 63. It will be apparent that by rotating shaft 60, sprocket wheels 58 and 63 will be rotated, tilting the fork so that the load thereon can be readily dumped, and after dumped, the fork may be readily returned to its operative position.

The fork can be adjusted in accordance with the pile of material to be engaged through the operation of the crank shaft 10, which will tilt the platform upon the transverse shaft 8 and from this it will be apparent that the tines 21 can be moved to close proximity to the surface upon which the pile of material is resting.

It will be noted that as soon as the fork with a load has been raised to the desired height, the lever 33 is shifted to disengage the friction cone 32 from friction cup 27 and this movement will raise the stem 38 in standard 39 and bring the brake shoe 37 into contact with the brake drum 36, retaining the drum against movement while the loaded fork is in a raised position.

The device as described and illustrated is comparatively simple in construction, and can be quickly and readily attached to a tractor or similar motor vehicle and the device used to a considerable advantage for transporting or loading manure and material of this character.

I claim:

1. In a device of the class described including a traction frame, a tiltable platform mounted upon the frame, a rotatable standard mounted on one end of the platform, an arm projecting outwardly from the standard and movable therewith, a fork rotatably and pivotally mounted on the outer end of said arm, means carried by the platform for imparting rotative movement to the standard, means for raising and lowering said fork relative to the platform and means independent of the latter means for tilting said fork.

2. A device of the class described including a traction supported frame, a tiltable platform mounted upon the frame, a rotatable tubular standard mounted on one end of the platform, an arm carried by the standard and extending outwardly from the platform, a fork pivotally and rotatably mounted on the arm, a rotatable drum carried by the platform, a cable attached to the fork above the pivot point and adapted to be wound upon the drum, means for imparting movement to the drum to wind the cable thereon for raising the fork, means for restraining the drum against movement, the weight of said fork causing the drum to unwind when the restraining means is released, means for imparting rotation to the standard for swinging the fork laterally relative the platform and means for rotating said fork independent of the latter means.

3. In a device of the class described, a traction supported frame, a tiltable platform carried thereby, a rotatable standard mounted on one end of the platform, a fork supported by the standard for pivotal and rotative movement, means for imparting rotative movement to the standard for swinging the fork laterally relative the platform, means for raising and lowering the fork and means for rotating the fork when in a raised position.

4. A device of the class described including a traction supported frame, a tiltable platform mounted thereon, means for raising and lowering the ends of said platform, a rotatable tubular standard mounted on one end of the platform, an arm carried by the standard and extending outwardly therefrom at an angle relative to the standard, a fork pivotally and rotatably mounted on the outer end of the arm, means for imparting rotative movement to the standard to swing said fork laterally relative to the platform, means for imparting a tilting movement to the fork for raising and lowering the outer end thereof, means for restraining said fork against rotation and means for rotating the fork upon the release of the restraining means.

5. The combination with a motor vehicle having a front traction axle, a traction frame connected to the axle, a pivotally mounted platform carried by the frame with the pivot point of said platform arranged adjacent the outer end thereof, a crank shaft movably engaging the inner end of the platform for moving the platform to a tilting position, a rotatable tubular standard carried by the outer end of the platform, a fork pivotally and rotatably supported from the standard, means for imparting rotative movement to the standard to swing the fork laterally relative to the platform, means for imparting a tilting movement to the fork for raising and lowering the outer end thereof, means restraining the fork against rotation and means whereby to rotate said fork upon the release of the restraining means.

In testimony that I claim the foregoing I have hereunto set my hand at Kewaunee, in the county of Kewaunee and State of Wisconsin.

RAYMOND H. FRISBIE.